United States Patent [19]
Nitta et al.

[11] Patent Number: 6,154,764
[45] Date of Patent: Nov. 28, 2000

[54] ON-LINE FORUM-TYPE ELECTRONIC CONFERENCE SYSTEM MAINTAINING CONSISTENCY OF MESSAGES

[75] Inventors: Minoru Nitta; Tetsuya Suehisa; Naoki Ishibashi; Katsuhiko Tomita, all of Shizuoka, Japan

[73] Assignee: Fujitsu Limited, Kawasaki, Japan

[21] Appl. No.: 08/890,448

[22] Filed: Jul. 9, 1997

[30] Foreign Application Priority Data

Jan. 31, 1997 [JP] Japan ................................ 9-019287

[51] Int. Cl.[7] .................................................. G06F 13/00
[52] U.S. Cl. ...................... 709/200; 709/221; 379/202
[58] Field of Search ....................... 395/200.03, 200.15, 395/200.04, 800, 200.13; 370/62, 94.1; 379/202, 204, 158; 709/224, 200, 221

[56] References Cited

U.S. PATENT DOCUMENTS

| | | | |
|---|---|---|---|
| 5,206,951 | 4/1993 | Khoyi et al. ........................... | 395/683 |
| 5,408,470 | 4/1995 | Rothrock et al. ....................... | 370/62 |
| 5,452,299 | 9/1995 | Thessin et al. ......................... | 370/260 |
| 5,680,551 | 10/1997 | Martino ................................ | 395/200.56 |
| 5,754,776 | 5/1998 | Hales et al. .......................... | 395/200.34 |
| 5,778,053 | 7/1998 | Skarbo et al. ........................ | 379/93.21 |
| 5,802,282 | 9/1998 | Hales et al. .......................... | 395/200.34 |
| 5,832,227 | 11/1998 | Anderson et al. ...................... | 709/224 |

OTHER PUBLICATIONS

Salemi, J., "E–mail may be enough", *PC Magazine*, vol. 13, No. 11, Jun. 14, 1994, pp. 198–199 & Computer Database Accession No. 01683334.

Wood, E.H., "The Norris Medical Library Bulletin Board," *Small Computers in Libraries*, vol. 8, No. 5, May 1988, pp. 30–34 & Computer Database Accession No. 01244861.

Lang, A., "Connecting to Customers," *AI Expert*, vol. 9, No. 3, Mar. 1994, pp. 13–15 & Computer Dtaabase Accession No. 01667476.

*Primary Examiner*—Zarni Maung
*Assistant Examiner*—Khanh Quang Dinh
*Attorney, Agent, or Firm*—Staas & Halsey LLP

[57] ABSTRACT

An electronic conference system in which a plurality of users post and read messages includes a message-deletion unit for deleting posted messages so that no access can be made to deleted messages. The electronic conference system further includes a deleted-message-information-management unit for storing identification information of the deleted messages.

12 Claims, 17 Drawing Sheets

| FOLDER NAME | I D | SPEAKER | DATE AND TIME | FILE NAME | LOCK |
|---|---|---|---|---|---|
| | | | | | |

FIG. 17

| FOLDER NAME | DATE AND TIME |
|---|---|
|  |  |
|  |  |
|  |  |
| ACCESSED-MESSAGE IDs ||
|  ||
|  ||
|  ||
|  ||

FIG. 18

| FOLDER NAME | DATE AND TIME OF LATEST UPDATING |
|---|---|
|  |  |
|  |  |
|  |  |

FIG. 19

| MESSAGE ID | DATE AND TIME OF DELETION |
|---|---|
|  |  |
|  |  |
|  |  |

FIG. 20

| FOLDER NAME | MESSAGE ID |
|---|---|
|  |  |
|  |  |
|  |  |

FIG. 22

| FOLDER NAME | MESSAGE ID | DATE AND TIME OF UPDATING |
|---|---|---|
|  |  |  |
|  |  |  |
|  |  |  |

ON-LINE FORUM-TYPE ELECTRONIC CONFERENCE SYSTEM MAINTAINING CONSISTENCY OF MESSAGES

BACKGROUND OF THE INVENTION

1. Field of the Invention

The present invention relates to an on-line, forum-type electronic conference systems in which a plurality of users post and read messages to hold debates, conferences, discussions, talks, opinion exchanges, trivial conversations, etc.

2. Description of the Related Art

Posted messages in on-line, forum-type electronic conference systems are organized into parent-child relationships so as to allow users to have better understanding of developments in a conversation. When a comment is given in response to a particular message, this particular message is treated as a parent, and a comment message is recorded as a child. A plurality of comments can be associated with one message, and a discussion is represented by a tree structure. A first message which initiated the discussion is called a topic message (or a topic), and comment message posted in response to other messages are referred to as reply messages.

Such an electronic conference system of a small size can be built on a small network based on a single server and several clients. When a large-scale such electronic conference system needs to be constructed to service users all over the world, for example, use of a single server is not appropriate. The load on the server and the network in this case undermines efficiency. Instead of use of a single server, an electronic conference system of a large scale is usually comprised of a plurality of small electronic conference systems connected with each other. Each of these small electronic conference systems is made up from a single server and a plurality of clients, and the servers of these systems share common data.

In a distributed system such as described above, a measure has been taken to reduce the load on the network. That is, when a message is posted to a given server, this message is not promptly transferred to other servers. Instead, this message is put together with other messages which are posted within a certain timeframe, and a set of messages is periodically sent to other servers.

The same applies in the case where a message is deleted from a server. The deletion of the message is not promptly reported to other servers, but is sent along with other messages when it is time to send these messages.

In a distributed electronic conference system, older messages are not always received ahead of newer messages. An order of message arrival is dependent on ways of running the network and network structures between servers.

Transferred messages are stored in a storage, which is referred to as a folder or a conference room, for example. This storage is dynamically created and deleted as such a need arises. In some cases, however, a message to be posted is received ahead of a notice requesting a creation of the storage.

For the sake of user convenience, such electronic conference systems typically store user history information, which records access history of each user as to which messages a given user has already read. When a user requests a list of posted messages, the user history information is used for helping the user to know which messages in the list have been already read. By looking through this list of messages, the user can learn whether any new messages are added to the list.

Since such an electronic conference system has only a limited size of memory storage, old messages need to be deleted as such deletion becomes necessary in order to secure the memory area for storing new messages.

There are other cases in which messages are deleted, as in a case in which a user requests for a deletion. When a given message is deleted, comment messages associated with this given message will become a topic message.

If an attempt is made to post a reply message (a message to become a child) when a parent message is no longer in existent because of deletion, this reply message is discarded. When a reply message and a parent message are transferred from different servers, it is possible that a server of the transfer destination receives the reply message ahead of the parent message. In this case, the reply message (a message to become a child) ends up being discarded since the parent message has not yet been received. This creates a problem in that some servers have some messages while different servers have different messages.

Further, user history information which is overgrown puts pressure on the memory area of the system, giving rise to a problem that no new messages can be posted.

In order to know whether any new messages are posted, users have no choice but to display a list of the posted messages. The load is imposed on the electronic conference system when the system has to check, one message, by one message whether messages on the list have already been read by a user. Further, it is a waste of time for a user to go to the extent of displaying the whole list just for the sake of checking if there is a newly posted message.

Further, when a discussion is ongoing for a long time, messages posted at an early stage of discussion may be deleted to secure the memory area of the electronic conference system. When this happens, users who have started participating halfway through the discussion may not know what initiated the discussion and what kind of comments have been posted.

Moreover, deletion of old messages results in a single tree structure of a discussion being divided into a plurality of tree structures when a deleted message has associated comment messages (child messages). In this case, the discussion can only be represented by a plurality of tree structures, so that users participating halfway through may encounter difficulties in grasping the whole picture of the discussion.

SUMMARY OF THE INVENTION

Accordingly, it is a general object of the present invention to overcome the problems described above.

In order to achieve the above object, the present invention stores message IDs of deleted messages, and performs the following operations.

Information on messages read by users is recorded with respect to each user. When a user logs in, information on deleted messages is removed from the information recorded with respect to this user.

When a reply message is received for posting but a parent message of this reply message is non-existent, a check is made whether the parent message is already deleted, based on recorded message IDs of deleted messages. Only when the parent message has been deleted, will the reply message be discarded.

When a notice to post a message is received ahead of a notice to create a storage space (e.g., referred to as a conference room or a folder) for storing the message, the same procedure is performed as in the case of the above reply message. That is, the message is discarded only when the folder has been already deleted.

A date and time of the latest message accessed by a user is recorded with respect to each user, and a date and time of the newest message posted in the system is also stored. When a user logs in, for example, a comparison is made between these two time records so as to make a prompt and easy decision as to whether any new message has been posted.

When old messages are to be deleted, a decision as to whether to delete messages is not made, message by message. Rather, a time period during which messages are valid is calculated with regard to a given discussion by using a date and time of creation of the newest message of the given discussion. When the newest message has expired, all the messages in the given discussion are deleted.

Further, a message ID which is uniquely assigned to a given message is comprised of a hierarchy number, an order number, and path information obtained within the framework of a corresponding discussion.

Other objects and further features of the present invention will be apparent from the following detailed description when read in conjunction with the accompanying drawings.

BRIEF DESCRIPTION OF THE DRAWINGS

FIG. 17 is an illustrative drawing showing a structure of the user history information;

FIG. 18 is an illustrative drawing showing a structure of a folder-management table;

FIG. 19 is an illustrative drawing showing a structure of a deletion table;

FIG. 20 is an illustrative drawing showing a structure of a new-message table;

FIG. 22 is an illustrative drawing showing a structure of a discussion-management table.

DESCRIPTION OF THE PREFERRED EMBODIMENTS

In the following, embodiments of the present invention will be described with reference to the accompanying drawings.

Figure 1:
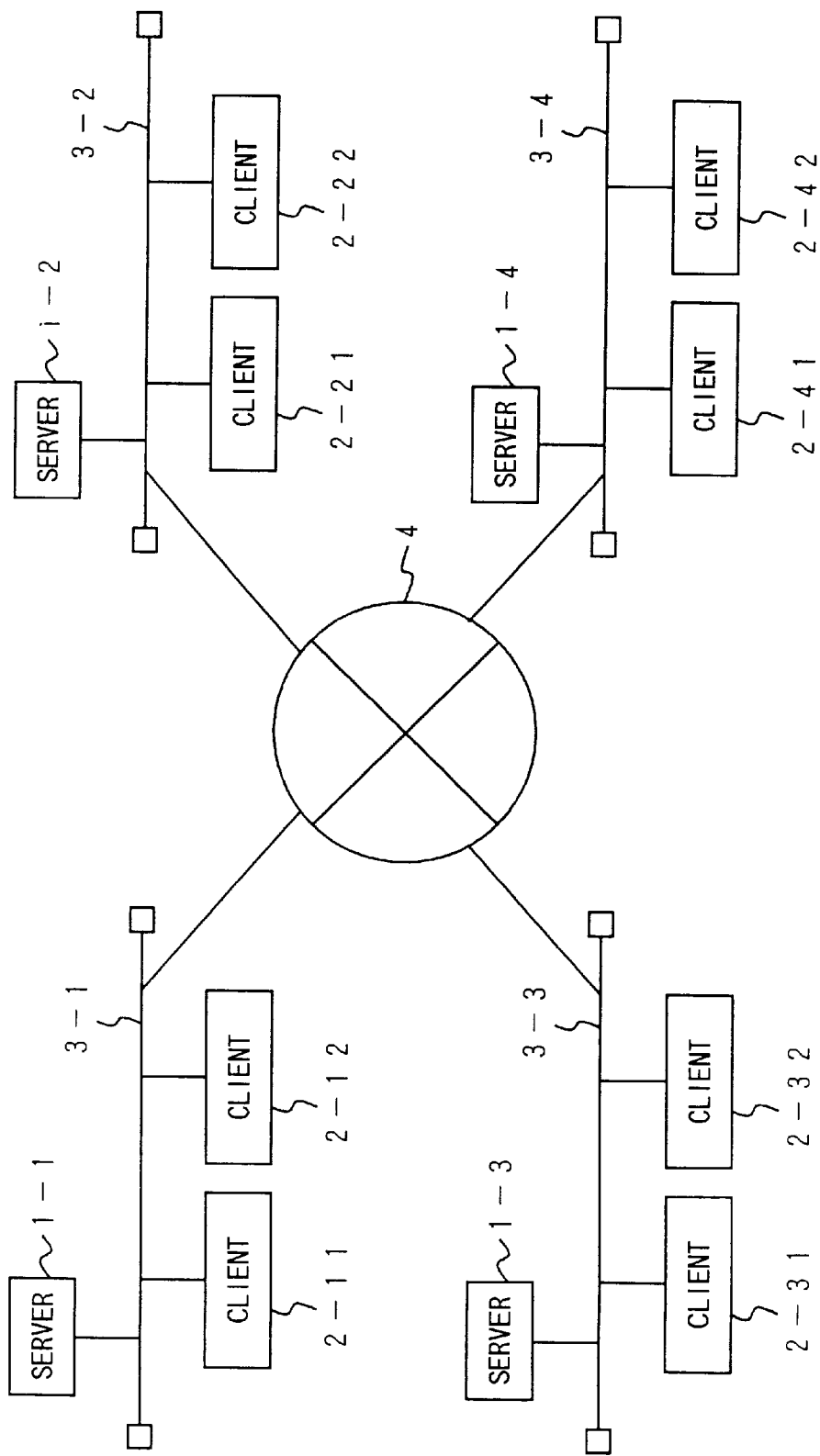
FIG. 1 is a block diagram of a distributed on-line, forum-type electronic conference system according to the present invention.

FIG. 1 is a block diagram of a distributed electronic conference system according to the present invention.

In the figure, servers are denoted by reference 1-*n* (1-1, 1-2, 1-3, and 1-4), clients are denoted by reference 2-*n* (2-11, 2-12, 2-21, 2-22, 2-31, 2-32, 2-41, and 2-42), and LAN (local area network) is denoted as 3-*n* (3-1, 3-2, 3-3, and 3-4). Further, WAN (wide area network) is denoted by reference 4.

Users of the electronic conference system log into a server 1-*n* on the LAN 3-*n* by using the client 2-*n*. After logging in, users can post messages to the server 1-*n*, and can read messages of the server 1-*n*, so that the users engage in a conference, a discussion, a debate, a trivial conversation, etc.

A particular user can only log in to a particular server which is assigned to this user in advance. Users of the client 2-1*n* can only log in to the server 1-1. By the same token, users of the client 2-2*n* can only log in to the server 1-2.

Messages posted to a server are periodically transferred to other servers. When a message stored in a given server is deleted, the deletion of this message is made known to other servers by sending a notice.

When messages are sent from other servers, a recipient server stores and posts these messages. When a given server receives a notice of message deletion from another server, the given server deletes the notified message from its own storage.

When a given server receives a notice from another server which asks for creation of a folder for storing a message, the given server creates a folder. When deletion of a folder is requested by a notice sent from another server, a recipient server deletes the folder.

In this manner, the plurality of servers can share the same messages.

The server 1-*n* is implemented by server programs which are executed by a conventional computer having a CPU and memories. An external memory device (not shown) is provided for the server 1-*n*, and has the server programs recorded therein. The server programs in the external memory device are loaded into a memory space of the computer, and are executed to provide a function of a server.

Client programs are executed by a conventional computer having a CPU and memories to implement a function of the client 2-*n*.

Figure 2:
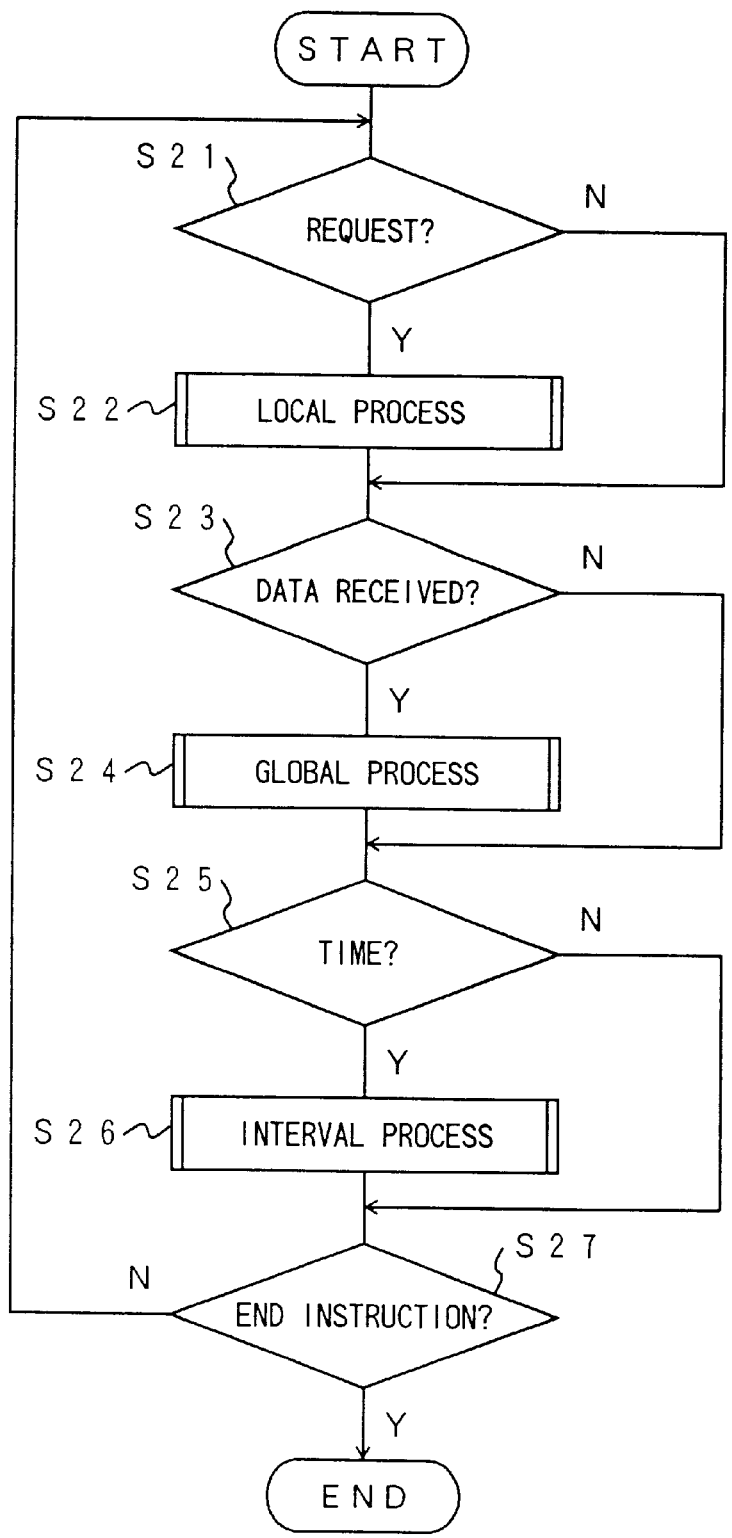
FIG. 2 is a flowchart of a process of a server shown in FIG. 1.

FIG. 2 is a flowchart of a process of the server 1-*n* shown in FIG. 1. As shown in the figure, the server 1-*n* performs three processes including a local process, a global process, and an interval process.

The server 1-*n* performs the local process when the client 2-*n* makes a request of some kind, and performs the global process when receiving data from another server. Further, the server 1-*n* attends to the interval process when a predetermined time interval has passed. If the time interval is set to 24 hours (one day), for example, the interval process is carried out at the same time every day.

In order to use the electronic conference system, a user has to log into the server 1-$n$ through the client 2-$n$. After the log-in process is completed, the server 1-$n$ responds to various requests made by the user. In responding to the requests, the server 1-$n$ sends data to the client 2-$n$ as the data becomes necessary.

The electronic conference system prepares a plurality of folders for storing posted messages with respect to respective topics. Each folder is given a unique name, and can be identified by the name. For example, a folder for storing posted messages regarding food may be given a name "FOOD". A folder for a sport topic may be provided with a name "SPORTS".

In what follows, data used in the embodiment will be described.

Figures 15, 16:
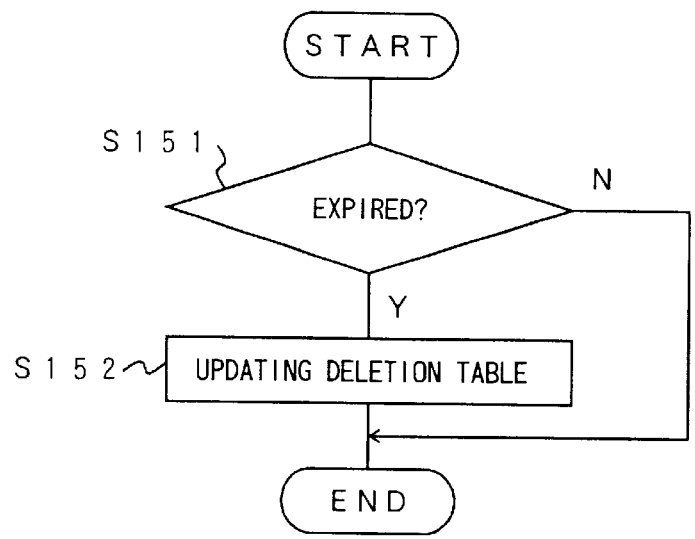
FIG. 15 is a flowchart of the deletion-information removing process shown in FIG. 14.
FIG. 16 is an illustrative drawing showing a structure of a message-management table.

FIG. 16 is an illustrative drawing showing a structure of a message-management table. The message-management table stores a folder name, a message ID, a name of a sender of a message, a date and time, a file name, and lock information with respect to each posted message. The message ID is a character string used for identifying the message, and each message is provided with a different message ID. A more detailed description will be given later with regard to the message ID.

The folder name is a name of the folder which stores the posted message.

The name of a sender of a message is a name of the user who created the message. Here, this name is a registered name used in the server 1-$n$.

The date and time indicates when the message is stored in the folder by the server 1-$n$ on request from the user.

Messages are stored as files in the external memory device. The file name is a name of a file which stores the message. The file name is automatically decided by the server when the message is stored. One message is stored as one file.

The lock information indicates whether the posted message is accessible to users, and takes the form of one of "yes" and "no". When it is "yes", users cannot access the posted message, whereas users can access and read the posted message when the lock information is "no".

Figure 21:
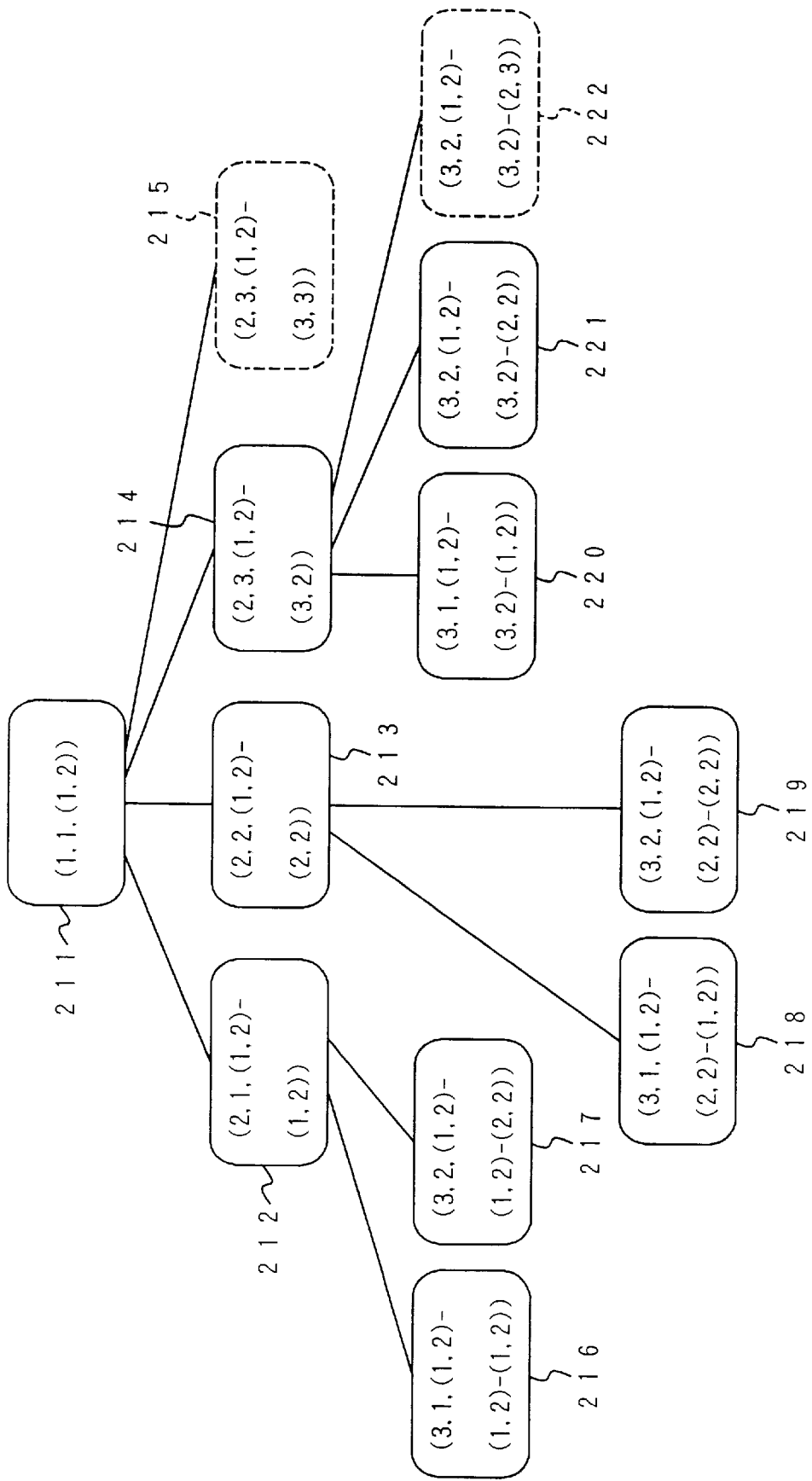
FIG. 21 is an illustrative drawing showing correspondence between message IDs and parent-child relations.

FIG. 21 is an illustrative drawing showing correspondence between message IDs and parent-child relations. A message which initiated a discussion (i.e., a first message of the discussion) is referred to as a topic message (or simply as a topic). Comment messages responding to the topic message are called reply messages. Messages responding to reply messages are also referred to as reply messages.

In FIG. 21, messages are denoted as 211 through 222, and the message 211 is the topic message. Messages 212 through 215 are reply messages posted in response to the (topic) message 211. The message 211 is a parent message of the messages 212 through 215. On the other way around, the messages 212 through 215 are child messages of the message 211. The same applies to relations between other messages.

The message ID is represented by a hierarchy number, an order number, and path information. The hierarchy number indicates a hierarchy level in which a given message is placed within a parent-child hierarchy structure.

The order number specifies what position a given message holds in ordered reply messages which are posted in response to a parent message. When the given message is a topic message, the order number indicates what position the given message has in ordered topic messages posted in a relevant folder.

In a server where a given message is posted, the order number indicates what position the given message holds in ordered topic messages posted in a given folder or what position the given message has in ordered reply messages posted in response to a parent message. When reply messages are posted to different servers in response to the same message, these reply messages end up having the same order number. In this case, however, a server-identification number which is included in the path information will be used to distinguish over other messages.

The path information is obtained by adding a server-identification number of a server which has provided a message ID (i.e., a server which has received a client's request to post a message) and the order number to the path information of a parent message. When a given message is a topic message, there is no parent message. In this case, the path information is a pair of the server-identification number of a server, which posted the given message, and the order number.

FIG. 17 is an illustrative drawing showing a structure of the user history information. The user history information includes a date and time of creation with respect to each folder name, and further includes accessed-message IDs.

The date and time of creation which is recorded with respect to each folder indicates when the latest message is created, where the latest message is selected among the messages stored in the folder and accessed by the user.

The accessed-message IDs represent message IDs of messages which are accessed by the user.

The user history information is maintained with respect to each user who logs into the server 1-$n$. Namely, a plurality of pieces of user history information are kept in one server.

FIG. 18 is an illustrative drawing showing a structure of a folder-management table. The folder-management table stores a date and time of the latest updating with respect to each folder. The date and time of the latest updating corresponds to the date and time when the latest message is created and posted to the folder. When a new folder is generated, a new entry is added to the table. When a folder is deleted, a corresponding entry is eliminated from the table.

FIG. 19 is an illustrative drawing showing a structure of a deletion table. The deletion table records a message ID of a deleted message along with a date and time of deletion when the message is deleted in a given server upon request from a client. When a folder is deleted upon folder-deletion request from a client, a name of the folder is recorded in place of a message ID.

FIG. 20 is a structure of a new-message table. The new-message table stores a folder name and a message ID when a folder having this folder name receives a posted message of this message ID upon request from a client.

Figure 3:
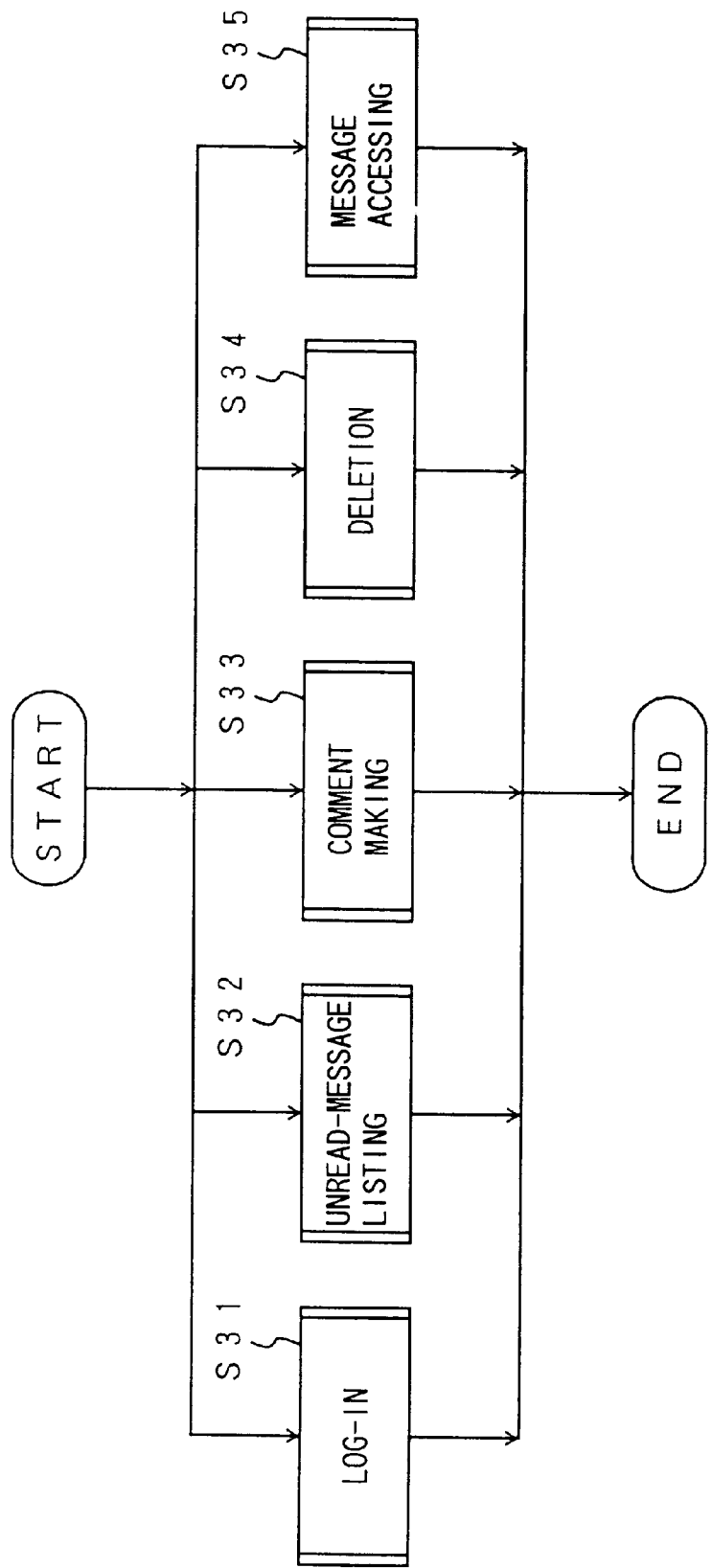
FIG. 3 is a flowchart of the local process of a server shown in FIG. 2.

FIG. 3 is a flowchart of the local process of a server. A server attends to various processes such as a log-in process, an unread-message listing process, a comment making process, a deletion process, and a message accessing process, depending on types of requests made by clients.

Figure 4:
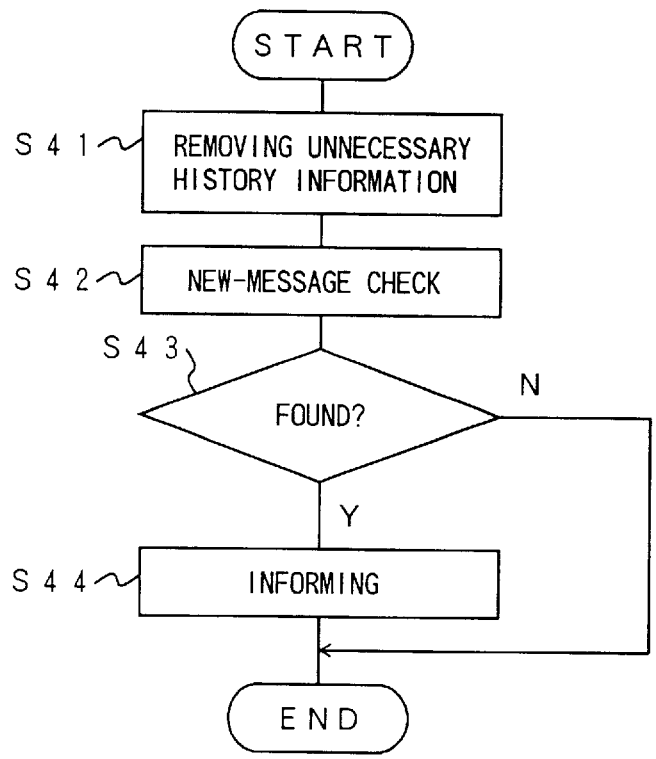
FIG. 4 is a flowchart of the log-in process shown in FIG. 3.

FIG. 4 is a flowchart of the log-in process. The log-in process is performed when there is a request for logging in from the client 2-$n$.

In the log-in process, message IDs are removed from the user history information of the user making a log-in request when these message IDs are listed in the deletion table (step S41).

Then, a check is made whether a new message is posted in a folder which is to be accessed by the user. The check as to whether any new message is posted is made by comparing a date and time stored in the folder-management table and a date and time stored in the user history information. If the date and time stored in the folder-management table is later in time than the date and time in the user history information, it is ascertained that there is a newly posted message (step S42, and step S43).

When there is a newly posted message, the client is informed of this. This allows the user to learn whether there is a newly posted message and to make a prompt decision as to whether to access the newly posted message.

Figure 5:
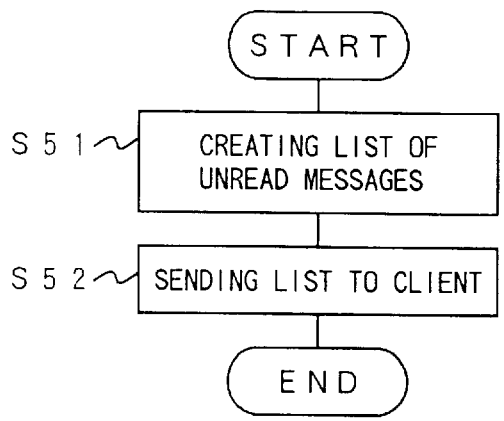
FIG. 5 is a flowchart of the unread-message listing process shown in FIG. 3.

FIG. 5 is a flowchart of the unread-message listing process. In this process, at a step S51, a list of unread messages is created. The list of unread messages is obtained by removing some messages from all the messages listed in the message-management table. Removed messages include those which have the lock information of "yes" in the message-management table, and those which are indicated by accessed-message IDs in the user history information of the user making the unread-message listing request.

After the list of unread messages is created, the list of unread messages is sent to the client which made the request (step S51).

Figure 6:
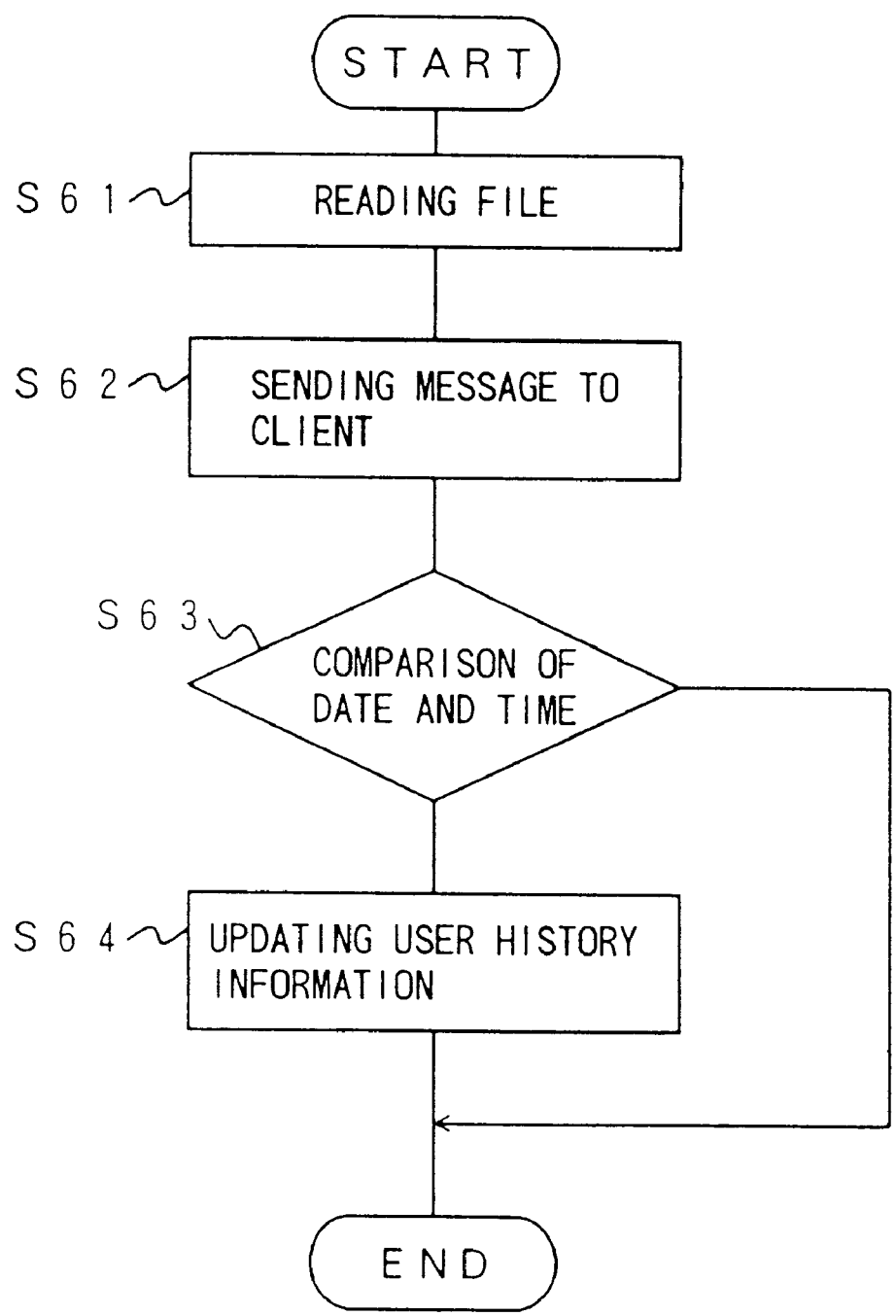
FIG. 6 is a flowchart of the message accessing process shown in FIG. 3.

FIG. 6 is a flowchart of the message accessing process. When the client 2-*n* makes a message accessing request to the server 1-*n*, the client 2-*n* informs the server 1-*n* of a message ID for specifying a message to be accessed.

The server 1-*n* searches in the message-management table by using the informed message ID as a key to the search, and obtains a file name of a file containing the message to be accessed. The server 1-*n* reads the message from the file (step S61). Then, the server 1-*n* sends the message to the client 2-*n* which has made the request (step S62).

After this, a comparison is made between a date and time of creation of the accessed message and a date and time which is stored in the user history information with respect to the folder that stores the accessed message. If the date and time of creation of the message is later in time than the date and time of the user history information, the date and time of the user history information is updated (steps S63 and S64).

Figure 7:
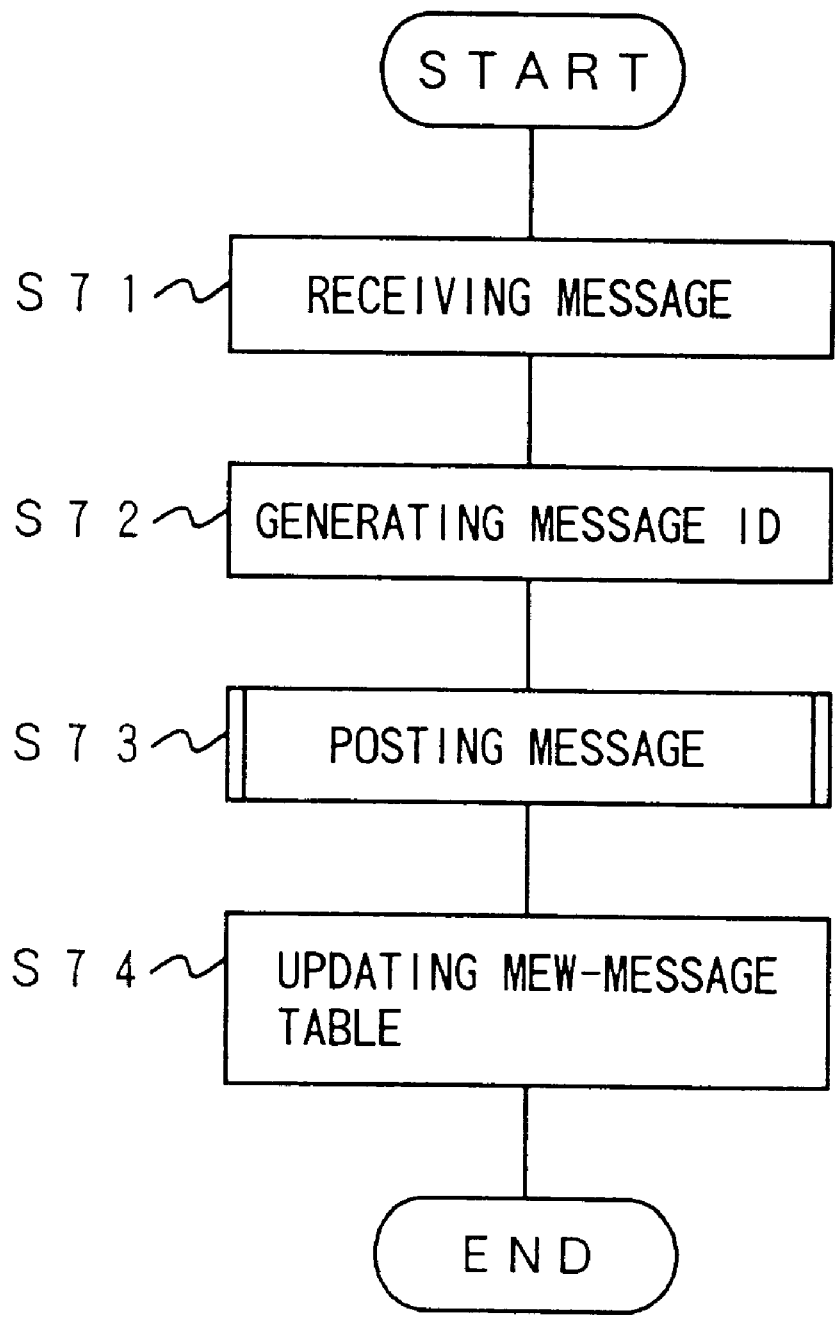
FIG. 7 is a flowchart of the comment making process shown in FIG. 3.

FIG. 7 is a flowchart of the comment making process. When a user makes a comment (posts a message), the client 2-*n* makes a posting request to the server 1-*n*. In addition, the client 2-*n* sends to the server 1-*n* a message to be posted and a name of a folder to store the message.

The server 1-*n* receives the message from the client 2-*n* (step S71). A message ID of the message is generated (step S72). The message is posted (step S73). Details of how to post a message will be later described. After the completion of the message posting, the message ID and the folder name is stored as a pair in the new-message table (step S74).

Figure 8:
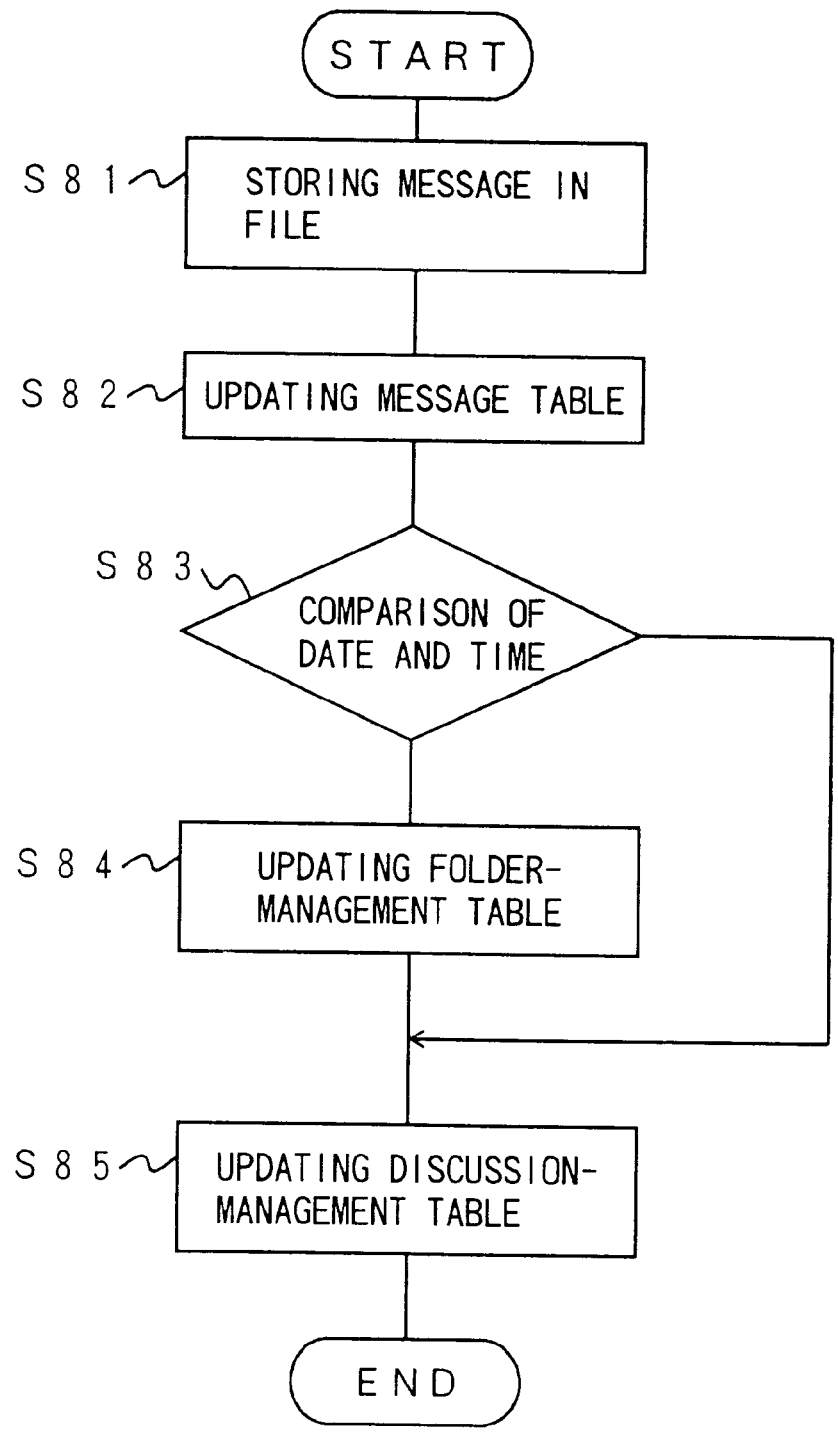
FIG. 8 is a flowchart of the message posting process shown in FIG. 7.

FIG. 8 is a flowchart of the message posting process. The contents of a message to be posted are stored in a file (step S81). Further, a message ID of the message, a name of a user posting the message (a user who created the message), a date and time of creation of the message (a date and time when the message is written in a file in the case where the posting process is initiated by a comment making request from the client), a file name of a file storing the message, and the lock information "no" are stored in the message table.

Then, a date and time of the latest updating with regard to the folder which stores the message is obtained from the folder-management table, and is compared with the date and time of creation of the posted message (step S83). If the date and time of creation of the posted message is later in time, this date and time is recorded in the folder-management table (step S84).

Relevant information regarding the posted message is stored in the discussion-management table (step S85) as shown in FIG. 22. When the message is a topic message, a folder name of the folder storing the message, the date and time of creation of the posted message, and the message ID are added to the discussion-management table. When the posted message is a reply message, a comparison is made between a date and time of updating in the discussion-management table and the date and time of creation of the message. If the date and time of creation of the message is newer, the date and time of updating in the discussion-management table is updated.

Figure 9:
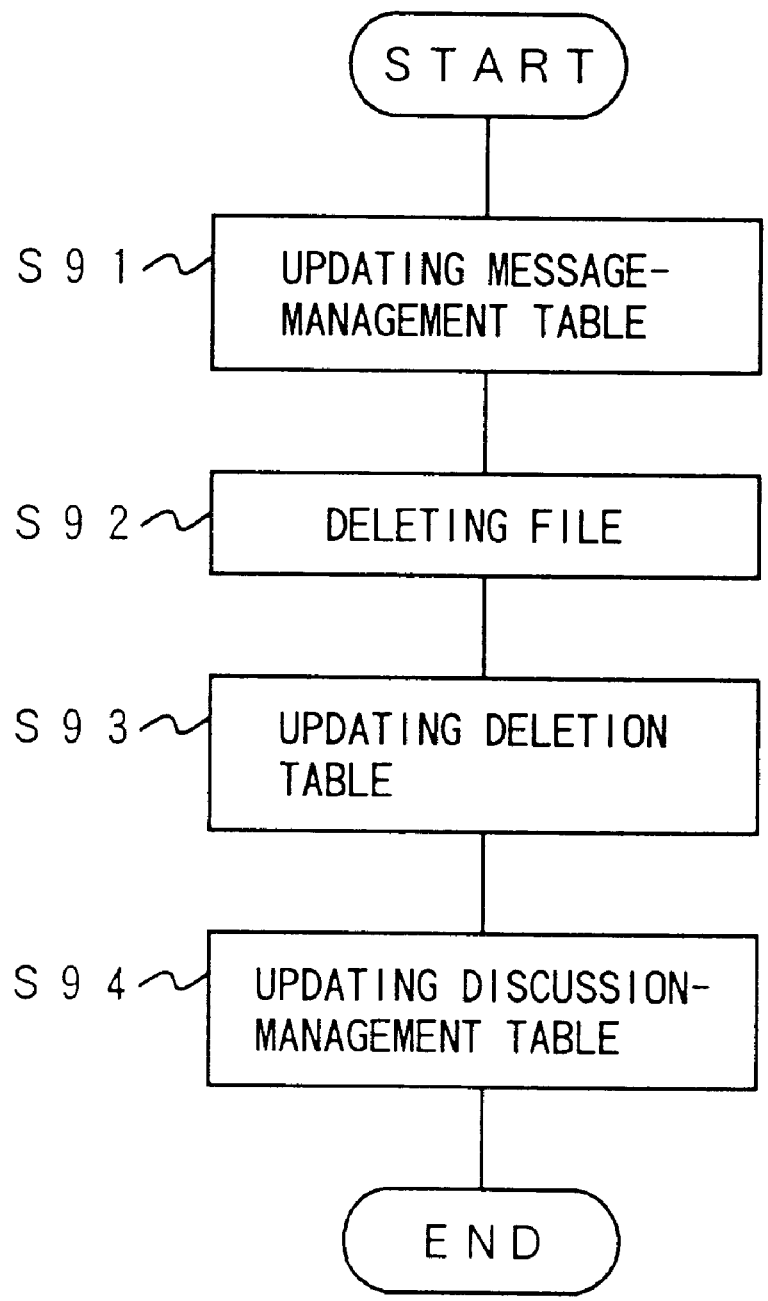
FIG. 9 is a flowchart of the deletion process shown in FIG. 3.

FIG. 9 is a flowchart of the deletion process. When a message is to be deleted, entry of the message is removed from the message-management table (step S91). A file which stores the message is deleted (step S92). A message ID of the deleted message is added to the deletion table (step S93).

When the deleted message is the latest one of the messages regarding the pertinent discussion (i.e., the date and time of updating in the discussion-management table corresponds to the date and time of creation of the deleted message), the date and time of updating is modified in the discussion-management table. That is, the data and time of updating is changed to a date and time of creation of a message which is the newest among the messages left after the above message deletion. If the deleted message is a topic message, a corresponding entry is removed from the discussion-management table.

If deletion of a folder is requested, the deletion process described above is performed with respect to all the messages posted in this folder. Then, a corresponding entry is removed from the folder-management table, and the folder name is added to the deletion table.

Figure 10:
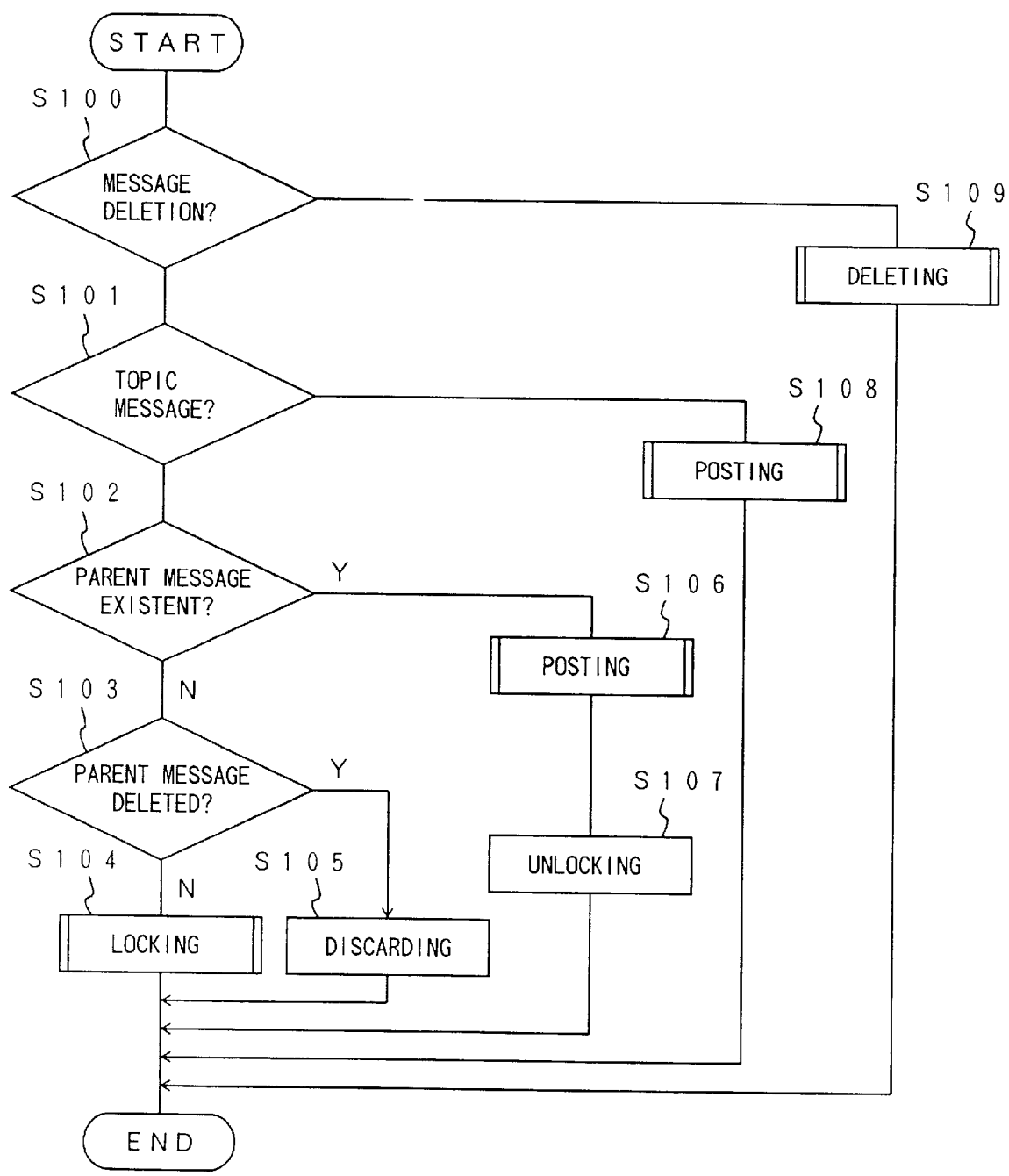
FIG. 10 is a flowchart of the global process shown in FIG. 2.

FIG. 10 is a flowchart of the global process. The global process is part of processes necessary to keep consistency of messages between the servers. The global process attends to adding data or deleting data in a server based on data sent from other servers.

When a server receives a notice of message deletion from another server which deletes a posted message, the server receiving this notice deletes a corresponding message in its own storage (steps S100 and S109). A description of message deletion is previously given in connection with FIG. 9. Deletion of a folder is taken care of in the same manner.

When a server receives a notice of posting a topic message from another server, the server receiving this notice posts the topic message (steps S101 and S108). Posting of a message has already been described in connection with FIG. 8.

Upon receiving a notice of posting a reply message from another server, a recipient server checks whether a parent message is posted in its own storage (step S102), and, then, the reply message is posted (step S106). The lock information of messages for which the posted message is a parent message is changed to "no" to unlock the messages which have the lock information of "yes". If other messages are able to be unlocked after unlocking the above messages, the same unlocking process is applied (step S107).

If a parent message is not posted when a notice of posting a reply message is provided, a check is made whether a message ID of the parent message is stored in the deletion table. This check determines whether the parent message has been already deleted or has not yet been sent from other servers for some reasons (step S103).

If the parent message is already deleted, the message received from another server is discarded without posting (step S105). If the parent message is not deleted, the received message is locked (step S104).

Figure 11:
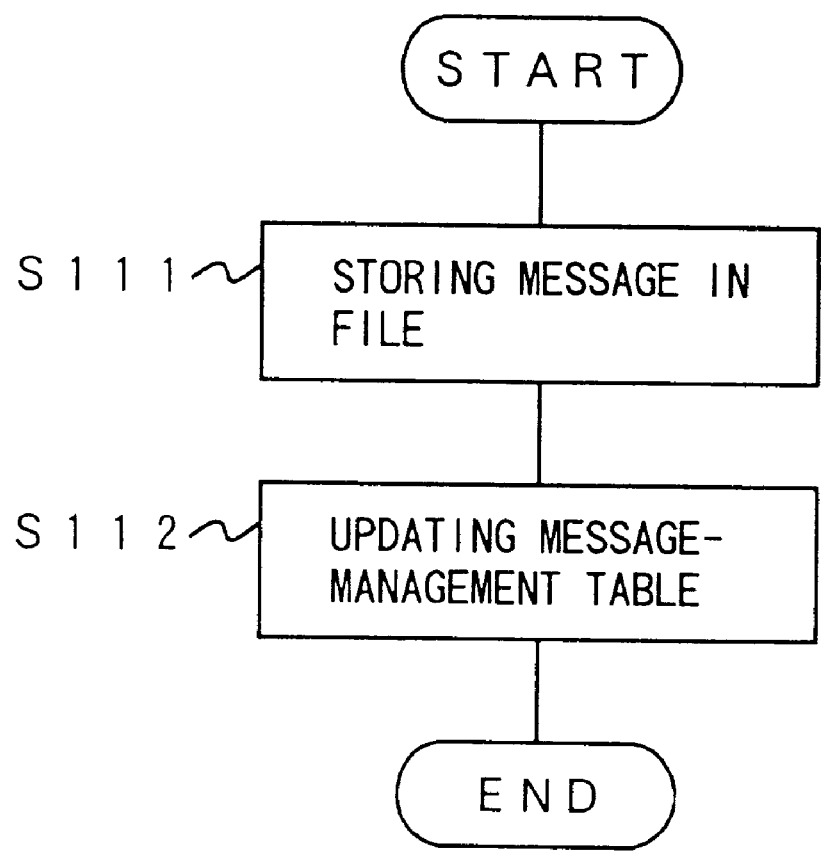
FIG. 11 is a flowchart of a locking process shown in FIG. 10.

FIG. 11 is a flowchart of a locking process. First, a message is stored in a file (step S111), and information on the message is added to the message-management table.

A message ID, a name of a user who created the message, and a date and time of creation are kept the same as they are reported from another server, and the lock information is set to "yes".

Figure 13:
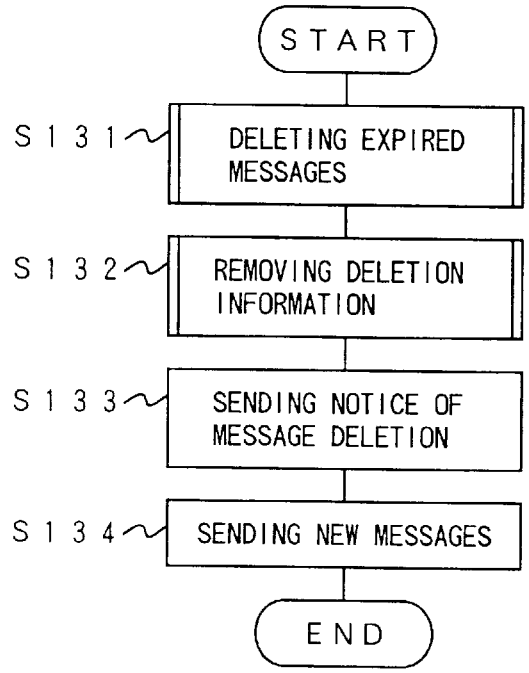
FIG. 13 is a flowchart of the interval process shown in FIG. 3.

FIG. 13 is a flowchart of the interval process. The interval process is periodically performed, and is part of processes necessary to keep consistency of messages between servers. The interval process is also aimed at reducing the amount of data stored in the servers.

Figure 14:
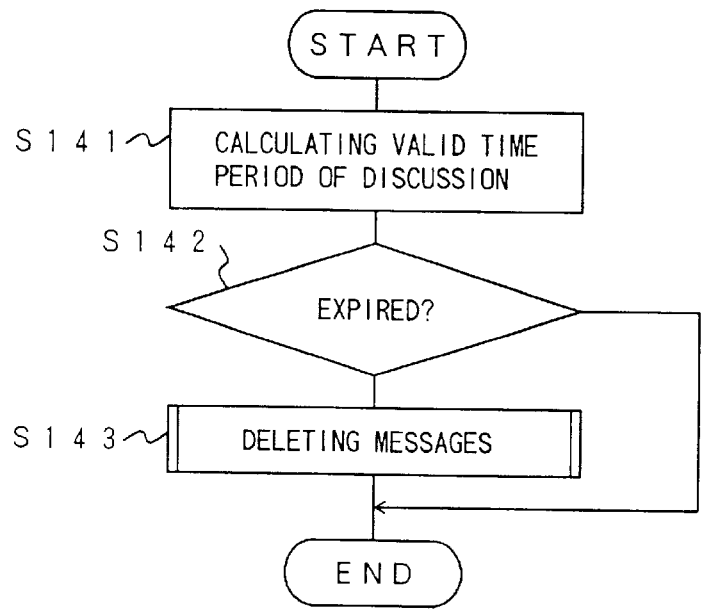
FIG. 14 is a flowchart of a process of deleting expired messages.

Expired messages are deleted (step S131). Details of a process of deleting expired messages will be given below with reference to FIG. 14.

Deletion of expired messages is not initiated by checking each message as to whether it is expired. Rather, a check is made with respect to each discussion forum. A period of time during which messages are valid is calculated with respect to a given discussion (step S141). An expiration date and time of this period is obtained by adding a predetermined number of days to the date and time stored in the discussion-management table. If the current date and time exceeds the expiration date and time, all messages of this discussion are deleted (steps S142 and S143). Deletion of each message is already described with reference to FIG. 9. Here, the predetermined number of days is decided based on administrative requirements such as how many days it takes to transfer a message posted in a given server to all the servers of the electronic conference system or how many days posted messages should be kept in the storage.

After deleting the expired messages, deletion information is removed (step S132 FIG. 13). Deletion information is necessary for checking whether a parent message of a received message sent from another server is already deleted, and is also needed for removing unnecessary parts of the user history information when a user logs in. Each time a message is deleted, however, the deletion information grows, so that memory resources of the servers will inevitably suffer a shortage in the end. To avoid this, unneeded information should be deleted from the deletion information.

FIG. 15 is a flowchart of the deletion-information removing process. As shown in the figure, an entry is removed from the deletion table when this entry has a date and time of deletion that is more than a predetermined days prior to the present date and time.

By using the data structure and the processes described above, the electronic conference system of the present invention can operate in an effective manner.

In the above description, the global process is performed such that a message received from another server is locked when a parent message of the received message is not posted in the message-management table and is not recorded in the deletion table. Alternately, such a received message may be posted immediately without being locked as shown in the following.

Figure 12:
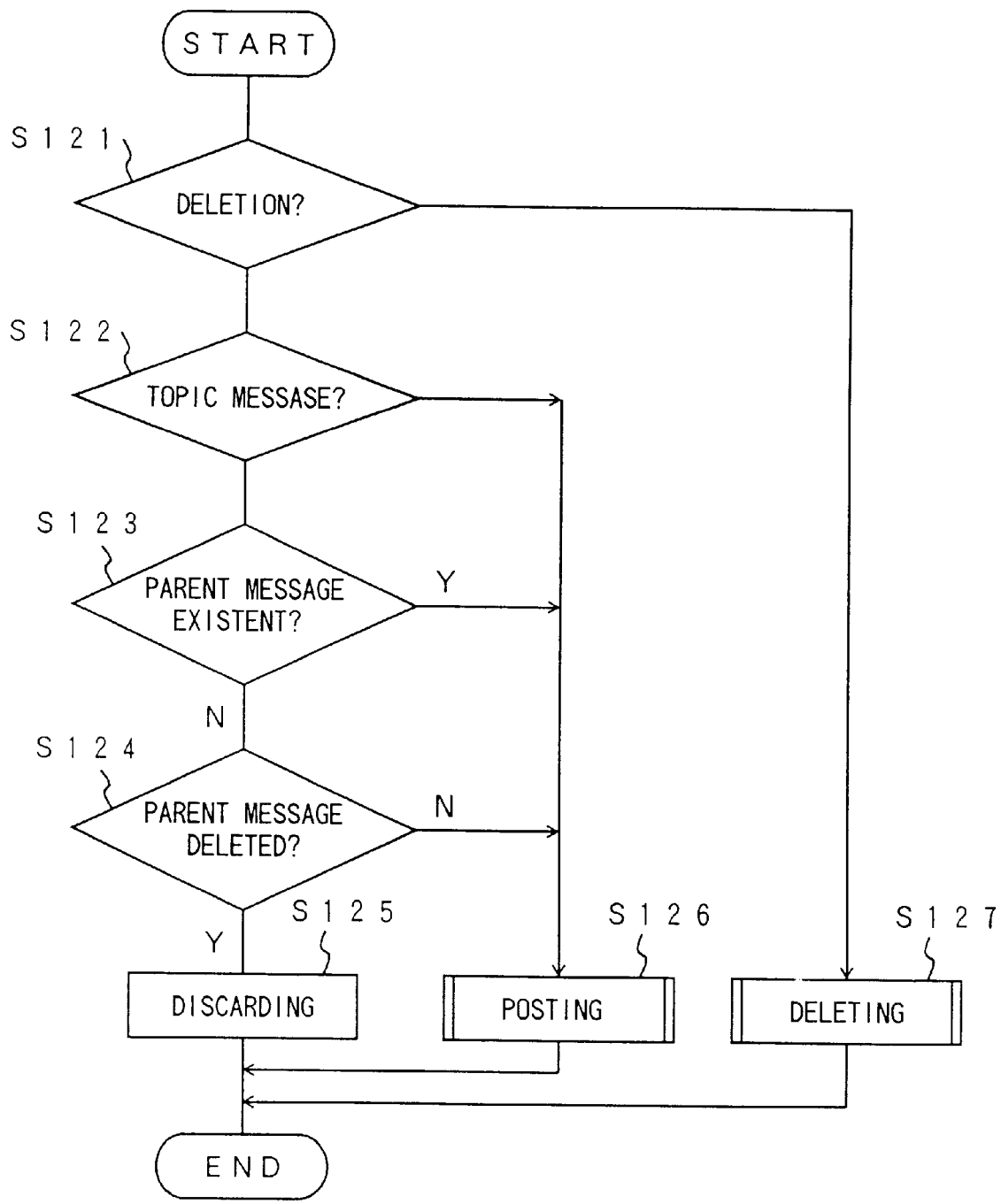
FIG. 12 is a flowchart of a second global process.

FIG. 12 is a flowchart of a second global process. If a received message is posted as in the process of the flowchart, a comment message responding to a parent message which is temporarily non-existent ends up being posted. This process, however, can avoid deleting a message which should not be removed.

Further, a topic message may not be unconditionally posted in the global process when it is received from another server. A check may be made whether the folder to post the topic message has been deleted as can be seen in the delete table, and the topic message may be discarded only when the folder is already deleted.

Moreover, the interval process may be performed such that each step is carried out at a different timing rather than performing all the step at one time.

In the present invention, message IDs and folder names of deleted messages are recorded. When a reply message or a topic message is received from another server and a parent message of the reply message or a folder of the topic message is non-existent, a decision can be correctly made as to whether the received message can be discarded. This avoids inconsistency of messages between servers.

Unnecessary portions of the user history information are deleted when a user logs into a server, so that an action required at the time of message deletion is recording the message ID of the deleted message. This achieves two mutually exclusive objectives at once, i.e., an efficient use of the memory space and a high-speed deletion process.

Deletion of old messages is performed with respect to each discussion by checking the date and time of creation of the latest message of each discussion, so that deletion of messages by ignoring developments of a discussion can be avoided. This ensures that messages posted at early stages are kept in record even if the discussion has been continuing for a long time. A discussion for which no new messages are posted is deleted, however, so that an efficient use of memory space in a server can be achieved.

Further, the message ID of the present invention represents what position a given message has in developments of discussion. Even when a message is deleted in an ongoing discussion, users can know that there was a message which was deleted, so that an order of messages in the discussion is not disrupted.

Further, the present invention is not limited to these embodiments, but variations and modifications may be made without departing from the scope of the present invention.

What is claimed is:

1. A system providing on-line, forum-type electronic conference services in which a plurality of users post and read messages, comprising:
   message-deletion means for deleting posted messages;
   a deletion table storing identification information of the deleted messages;
   a user history information memory storing identification information of accessed messages accessed by the give user; and
   a user-history-information updating means for deleting the identification information of the accessed messages from said user history information if the identification information of the accessed messages is found in said deletion table when the given user starts using services of said system.

2. The electronic conference system as claimed in claim 1, further comprising:
   means for discarding a message associated with one of another message and a message folder when said one of another message and said message folder is already deleted;

means for locking said message so as to prevent access to said message when said one of another message and said message folder is not deleted; and means for unlocking said message so as to allow access to said message when said one of another message and said message folder is posted.

3. A system providing on-line, forum-type electronic conference services in which a plurality of users post and read messages, comprising:

a folder-management table storing a date and time of creation of a newest message with respect to a respective folder; and a user history information file, provided for a given user, storing a date and time of creation of a latest message in the folder, accessed by the given user; and a comparator comparing the data and time of creation, between the newest stored message and the latest accessed message, so as to notify the given user of unread messages.

4. An electronic conference system in which a plurality of users post and read messages, said electronic conference system comprising:

discussion-management means for storing messages with respect to each discussion; and deletion means for deleting all messages regarding a given discussion when a latest message of said given discussion has expired.

5. A system providing on-line, forum-type electronic conference services in which a plurality of users post and read messages via servers interconnected through a network, the messages being posted to initiate a discussion or in response to respective, previous messages, said system comprising:

a message-management table storing information on messages, said information including a message ID unique to each of said messages; and means for determining said message ID for a given message by combining a hierarchy number, representing a level at which the given message is positioned, in a hierarchy in which a reply message responding to a previous message is at a next-lower level relatively to a level at which the previous message is positioned, an order number, representing a position which the given message holds in ordered messages, and path information, indicating a server to which the given message is posted.

6. A computer readable medium storing therein a computer program providing on-line, forum-type electronic conference services in which a plurality of users post and read messages, said computer program comprising:

message-deletion means for deleting posted messages;

deleted-message-information-management means for storing identification information of the deleted messages;

a user history information memory storing identification information of accessed messages accessed by the give user; and a user-history-information updating means for deleting the identification information of the accessed messages from said user history information if the identification information of the accessed messages is found in said deletion table when the given user starts using services of said system.

7. The computer readable medium as claimed in claim 6, wherein said computer program further comprises:

means for discarding a message associated with one of another message and a message folder when said one of another message and said message folder is already deleted;

means for locking said message so as to prevent access to said message when said one of another message and said message folder is not deleted; and means for unlocking said message so as to allow access to said message when said one of another message and said message folder is posted.

8. A computer readable medium having a computer program embodied therein for providing a computer-network forum in which a plurality of users post and read messages, said computer program comprising:

first means for storing a date and time of creation of a newest message with respect to a folder relating to a respective topic;

second means for storing a date and time of creation of a latest message which is accessed by the given user in the folder; and third means for comparing the date and time of creation between the newest stored message and the latest accessed message so as to notify the given user of unread messages.

9. A computer readable medium providing a computer program for embodying an electronic conference system in which a plurality of users post and read messages, said computer program comprising:

discussion-management means for storing messages with respect to each discussion; and deletion means for deleting all messages regarding a given discussion when a latest message of said given discussion has expired.

10. The system as recited in claim 3, further comprising plural folders relating to plural, respective topics, messages relating to a given topic being contained in the respective folder for that topic and the folder-management table storing the date and time of creation of each newest message with respect to the respective folder for the topic of the newest message.

11. The system as recited in claim 8, further comprising:

plural folders relating to plural, respective topics, messages relating to a given topic being contained in the respective folder for that topic;

the first means storing a date and time of creation of a newest message with respect to the respective folder therefor in accordance with the topic of the newest message;

the second means storing the date and time of creation of the latest message which is accessed by the given user with respect to the respective folder therefor; and the third means comparing the date and time of creation between the newest stored message and the latest access message of a common topic with respect to the respective folder therefor, so as to notify the given user of unread messages in the folder.

12. A computer readable medium storing therein a computer program providing on-line, forum-type electronic conference services in which a plurality of users post and read messages, by:

deleting posted messages;

storing identification information of the deleted message;

storing identification information of accessed messages accessed by a given user; and deleting the stored identification information of the accessed messages if the identification information of the access message is found at a time when a given user starts using services of the system.

* * * * *

UNITED STATES PATENT AND TRADEMARK OFFICE
CERTIFICATE OF CORRECTION

PATENT NO. : 6,154,764
DATED : November 28, 2000
INVENTOR(S) : Minoru Nitta et al.

Page 1 of 1

It is certified that error appears in the above-identified patent and that said Letters Patent is hereby corrected as shown below:

Column 10,
Line 54, change "give" to -- given --;
Line 58, after "information" insert -- memory --.

Column 11,
Line 54, change "give" to -- given --;
Line 58, after "information" insert -- memory --.

Signed and Sealed this

Twenty-fifth Day of September, 2001

*Attest:*

*Attesting Officer*

NICHOLAS P. GODICI
*Acting Director of the United States Patent and Trademark Office*